Oct. 18, 1938.  A. P. FREEMAN  2,133,385
X-RAY GRID AND METHOD OF MAKING SAME
Filed May 8, 1937
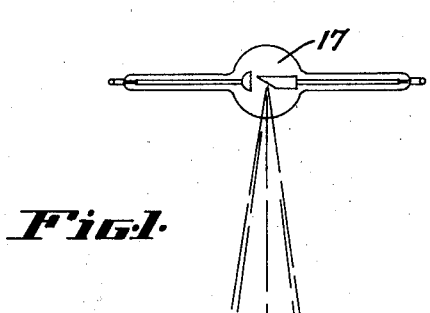
Fig.1.
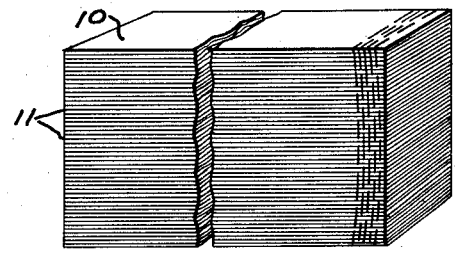
Fig.2.
Fig.3.  Fig.4.
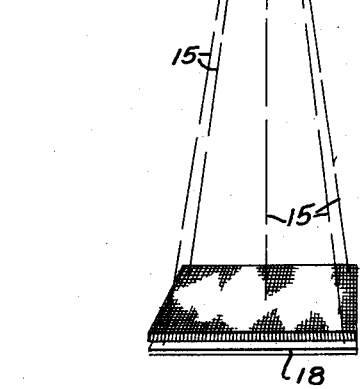
Fig.6.
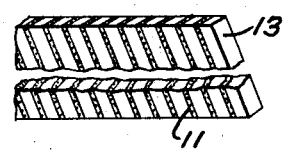
Fig.5.
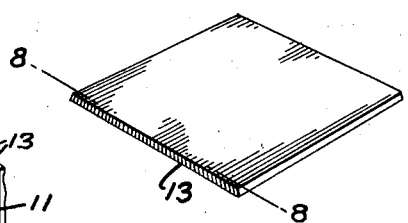
Fig.8.
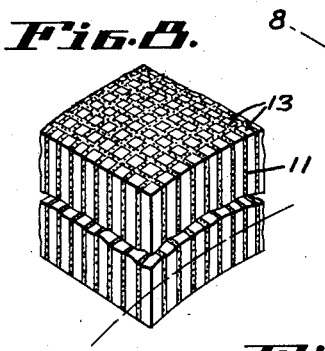
Fig.7.
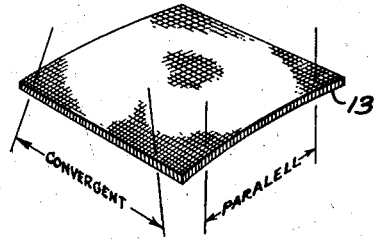
Fig.9.
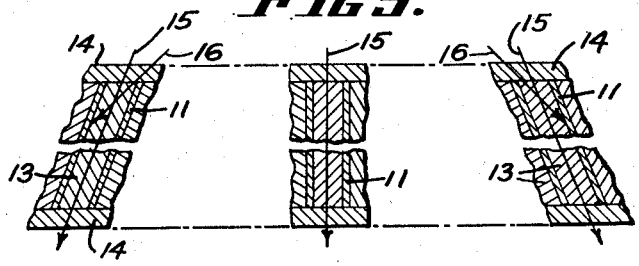
INVENTOR.
ANTONY P. FREEMAN
BY Jas. M. Naylor
ATTORNEY.

Patented Oct. 18, 1938

2,133,385

UNITED STATES PATENT OFFICE 2,133,385

X-RAY GRID AND METHOD OF MAKING SAME

Antony P. Freeman, San Francisco, Calif.

Application May 8, 1937, Serial No. 141,511

4 Claims. (Cl. 250—34)

This invention relates to X-ray grids and has for one of its objects the provision of a grid which will protect Roentgen images against secondary rays. It also has for an object the provision of a simplified method of manufacturing such X-ray grids.

I am aware of the fact that the prior art shows several devices of this general character, particularly the patent to Gustav Bucky, No. 1,476,048, dated December 4, 1923, but it is to overcome the practical objections to these prior art devices that the present invention was devised.

It has come to my attention that the known structures are not adaptable or completely satisfactory for practical X-ray work. For instance, substantially all of them are too bulky and require far too much space between the object to be photographed and the plate. An example of this is noted in preparing plates of suspected cranial injuries. There it frequently becomes necessary to strap the plate directly upon the patient's head to obtain the best results. Here, it will be appreciated, it is impractical to use a grid which is bulky in constructon or which, due to its particular design, has to be shifted or moved at intervals to avoid leaving objectionable marks on the plate.

Furthermore, in comparing the present invention with the prior art, it should be definitely borne in mind that the known slatted grid structures do not exclude or intercept such secondary radiation as will be found to lie in the planes of the permeable interstices. The present invention contemplates the correction of this condition.

With these facts in mind, it is an object of the present invention to provide a grid which is highly pervious to the primary rays but not the secondary rays and which will not require shifting or moving at intervals to attain the desired clarity of prints. Furthermore, it is an object of this invention to provide a device of this character which will be light in weight, and therefore easily handled, and not too bulky for difficult cases such as are frequently encountered.

Another object of the invention is the provision of a simplified method of manufacturing the grids forming the subject matter hereof, as a means of keeping the cost at a practical, commercial figure and therefore available for universal use.

Other objects of this invention will become apparent as this specification proceeds and the particular novelty of the invention will be pointed out in the appended claims.

In the drawing forming a part of this specification,

Figure 1 is a diagram showing one use of the invention in connection with a conventional X-ray tube, Figure 2 is a perspective of a block of the materials showing a step in the method of producing the invention, with dotted lines directing a further step, Figure 3 is an end view of the product of such further step, Figure 4 is an end view of the matter in Figure 3 following another step, Figure 5 is a perspective of the subject matter of Figure 4 bearing indication of a further step, Figure 6 is an enlarged perspective of a portion of the product of such further step, Figure 7 is a perspective of a plate showing another step in the method, such plate being comprised of a great number of complete units of the subject matter of Figure 6, Figure 8 is an enlarged perspective of a portion of a corner of the subject matter of Figure 7, broken in the vertical sense to save space, and indicating its microscopic fibrous structure at this stage, Figure 9 is an enlarged fragmentary sectional scheme of the plate of Figure 1 when the latter has finally been prepared for use.

It will be appreciated, of course, in considering the drawing referred to in the preceding paragraphs that substantially all of the figures have been considerably magnified for sake of clarity since in actual practice the thickness of the grid may be less than one eighth inch and its component elements are measured in terms of thousandths of an inch.

In the first step of the method, a plurality of thin sheets 10 of Celluloid or other suitable permeable material are secured together in block form by intervening thinner sheets or layers 11 of suitable X-ray impermeable substance such as lead-leaf or cement. It is quite likely that the particular cement which would be used in this connection would consist of finely divided lead particles mixed with an adhesive to provide a cement of great opaqueness or of lead leaf coated with a suitable adhesive.

The relative thickness of the sheets of permeable material to impermeable cement is approximately ten one-thousandths to one one-thousandth of an inch, respectively.

As will be noted from Figure 2, the sheets of permeable and impermeable material, 10 and 11, respectively, are arranged alternately in layers and adhesively joined together to form a block. As illustrated, the block is broken to indicate indefinite length or length according to the convenience of the manufacturer.

Curved slabs are then cut off the end of the block of Figure 2, as indicated by the dotted lines, as for example, with a band saw. The curves of the cuts are modified catenaries which contain the necessary potential focal properties. Each curved slab represents one grid in what might be termed the second stage of manufacture. Figure 3 is an end view of such slab. It will be seen that the elements of the slab are parallel although the mass of the same is curved.

The next step in the method consists in flattening the curved slab of Figure 3 to the form shown in Figure 4. The elements of the slab are now convergent to a focal line above and parallel to the surface of the slab at right angles to the end shown. In other words the planes of the elements of the plate at this stage are concurrent at a line parallel to the surface of the plate at a distance above it.

The next step in the method of preparing the grid is to cut strips from the edge or end of the plate of Figure 5 in planes at right angles to the surface of the same to obtain that which is shown greatly enlarged in Figure 6 of the drawing. For example, this is accomplished by the making of a transverse cut such as is indicated by the dotted line 8—8 in Figure 5. The thickness of these strips corresponds to the thickness of the original sheets of permeable material and would therefore approximate ten one-thousandths of an inch in thickness.

The next step in the method of producing the grid contemplates the joinder of the strips, such as are illustrated in Figure 6, by means of intervening thinner layers of an opaque, adhesive medium, such as that initially used to join the sheets in the block of Figure 2, the strips being assembled on or between suitable curved forms to reach the result shown in Figure 7. This curvature should be the same as that of the slab in Figure 3.

As illustrated in Figure 8 of the drawings the result thus accomplished is the provision of a grid of a modified catenary shape which is composed of a plurality of cells 13, approximately ten one-thousandths of an inch square.

The next step in the method comprises the flattening of that which is shown in Figure 7 in a manner similar to that used in the production of Figure 4. It is important to note that that property mentioned as a focal line in Figure 4 now becomes a focal point.

As a final step the grid 19 is dressed or trimmed to even thickness; its edges are squared and thin layers of permeable material 14 are secured to its top and bottom to serve as binders and as protection from injury. The edges may then be bound in metal channels or in any conventional fashion (not shown).

It will now be seen that the cells 13 which, as illustrated in Figure 7, were parallel in one sense, are now convergent. The size of the focal area of such convergence is largely dependent upon the proportion or ratio of the cross section dimensions of the cells to their length and upon the care used in platting the curvatures of the surfaces during the assembling steps.

Upon these curves, obviously, the distance of the focal region also depends. Ordinarily the focal region would, of course, be the location of the source of radiation.

The convergence of the cells 13 is quite plainly illustrated in Figure 9 of the drawing which represents, as stated, an enlarged section through the grid, broken into six fragments for the sake of space. The arrows 15 represent the primary rays and the arrows 16 indicate possible courses of the secondary rays. The rays 15, of course, are assumed to have originated at the anode of the Roentgen tube 17 (see Figure 1). It is apparent that those rays which do not point to the focal region are stopped by the opaque element 11 while those rays which do so point are freely passed through to the photo plate 18.

The advantages of such a grid are considerable and should be immediately obvious to those skilled in this art. The grid yields a picture made up of a vast number of fine dots reesmbling the familiar half-tone cut of the photo-engraver's art. It effectively filters out all secondary radiation not coincident with the primary. It leaves none of the annoying or confusing marks on the plates as presently found in use of many of the known structures, the marking being so fine as to be imperceptible except upon extremely close scrutiny or with the aid of magnification. While the grid forming the subject matter of this invention is not intended to be shifted or moved during use, it is interesting to note that an effect of psuedo third dimension can be attained by shifting the grid very slightly during exposure or in two separate exposures in the manner in which such effects are attained in the photo-engraver's art.

Although the grid forming the subject matter of this invention is primarily intended for use in Roentgenography, I do not wish to limit myself solely to this art, being fully cognizant of the possibility of the application of this principle in the field of television and other arts. As an example, it occurs to me that my device may be useful in conjunction with a scanning device to screen out undesirable rays and thus sharpen the image being transmitted. While in the drawings I have illustrated a preferred form of grid, I do not wish to limit myself to this form only as it is appreciated that the article may take a number of forms.

Having thus described my invention what I desire to secure by grant of Letters Patent, and therefore claim, is:

1. The method of making a grid for X-ray photography which comprises the steps of first preparing a block of sheets of X-ray permeable material with intervening layers of X-ray impermeable material, next cutting curved slabs from the end of the block, then flattening the individual slabs, next cutting slices from the ends of the slabs, then joining the slices by intervening layers of X-ray impermeable material on a curvature comparable to that of the slabs cut from the original block, and then flattening the plate thus made.

2. The method of making a grid for X-ray photography which comprises the steps of first preparing a block of sheets of X-ray permeable material with intervening layers of X-ray impermeable material, next cutting curved slabs from the end of the block, then flattening the slabs, next cutting slices from the end of the slabs at right angles to the largest surfaces of the slab, said slices corresponding in thickness to the permeable sheets in the original block of material, then joining the slices side by side by intervening layers of X-ray impermeable material on a curvature comparable to that of the slabs cut from the original block, and then flattening the plate thus made.

3. The method of making a grid for X-ray photography which comprises the steps of first preparing a block of sheets of X-ray permeable material bound by intervening layers of X-ray impermeable material, next cutting curved slabs from the end of the block, then flattening the slabs, next cutting slices from the ends of the slabs at right angles to the plane of the strips comprising the same, said slices corresponding in thickness to the permeable sheets in the original block of material, then binding the slices side to side by intervening layers of X-ray impermeable material on a curvature comparable to that of the slabs cut from the original block, and then flattening the plate thus made.

4. The method of making a grid for X-ray photography which comprises the steps of first preparing a block of sheets of X-ray permeable material bound by intervening layers of X-ray impermeable material, next cutting curved slabs from the end of the block, then flattening the slabs, next cutting slices from the ends of the slabs at right angles to the plane of the strips comprising the same, said slices corresponding in thickness to the permeable sheets in the original block of material, then binding the slices side to side by intervening layers of X-ray impermeable material on a curvature comparable to that of the slabs cut from the original block, then flattening the plate thus made, and finally binding the top and bottom surfaces of the plate with an X-ray permeable material.

ANTONY P. FREEMAN.